Jan. 3, 1967 B. SMITH 3,295,487
HYDROFOIL SAILBOAT

Filed Sept. 23, 1965 4 Sheets-Sheet 1

INVENTOR
BERNARD SMITH

BY

*Claude Funkhouser*
ATTORNEY
*Richard D. Grauer*
AGENT

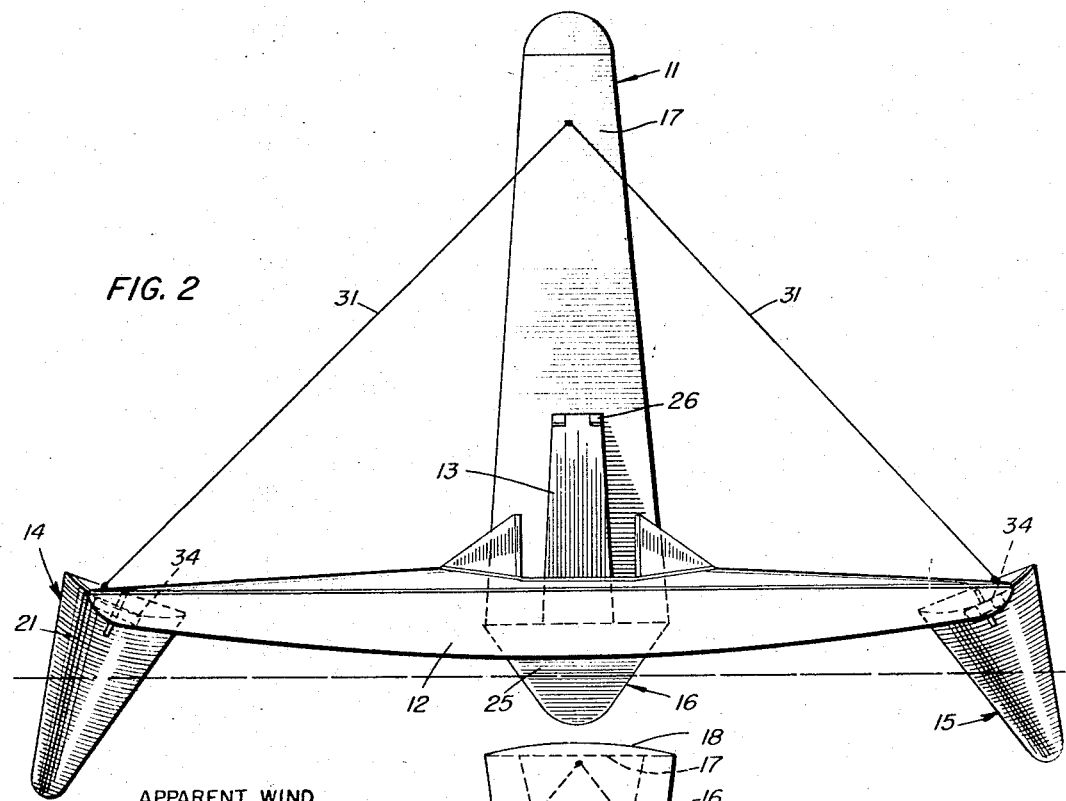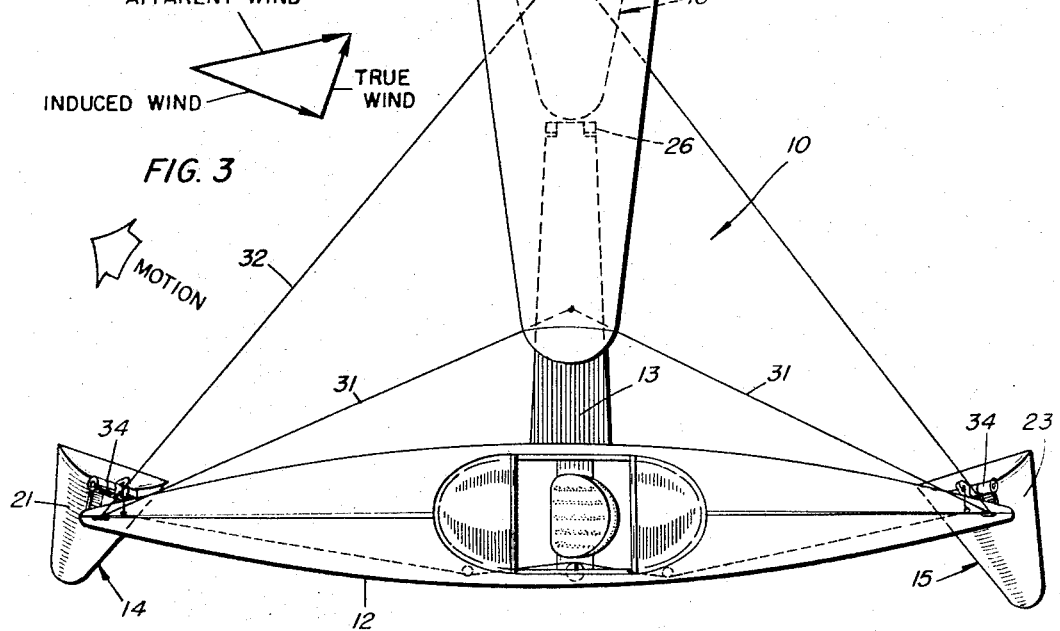

Jan. 3, 1967 B. SMITH 3,295,487
HYDROFOIL SAILBOAT
Filed Sept. 23, 1965 4 Sheets-Sheet 3

Jan. 3, 1967  B. SMITH  3,295,487
HYDROFOIL SAILBOAT
Filed Sept. 23, 1965  4 Sheets-Sheet 4

United States Patent Office 3,295,487
Patented Jan. 3, 1967

3,295,487
HYDROFOIL SAILBOAT
Bernard Smith, 526 Caffee Circle, Dahlgren, Va. 22448
Filed Sept. 23, 1965, Ser. No. 489,770
9 Claims. (Cl. 114—66.5)

The invention described herein may be manufactured and used by or for the Government of the United States of America for governmental purposes without the payment of any royalties thereon or therefor.

This invention relates generally to sailboats and more particularly to a hull-less craft supported on a plurality of hydrofoils and deriving its motive force from the lift created by the flow of the wind over an inclined rigid airfoil.

The forty-five hundred year recorded history of sailboats represents a continuous effort to increase the speed potential of such vessels and their ability to make headway into the wind. The earliest sailing craft were limited to sailing in a generally downwind direction. With the advent of tacking sailboats, having the ability to travel at right angles to the wind or even in a slightly upwind direction, new problems were introduced. Chief among these was the provision of means for resisting the leeward drift and overturning moment which result from the sideward component of the force generated by the sail. The capacity to sail in a generally upwind direction increased with the slow evolution of hull, sail, and rigging design.

Even after the turn of the Twentieth Century, three basic obstacles remained to any substantial improvement in either the speed potential of sailing craft or their ability to proceed in a windward direction. The first of these is the drag induced by the motion of the hull through the water. This drag can be treated in three parts; (a) viscous drag, or skin friction, (b) intertial drag, a measure of the reluctance of the water to separate and close behind a body moving through it, and (c) wave drag, a function of the speed of the boat and the length of its waterline. Wave drag imposes the most critical barrier to speed since it increases at a very high rate when the wave length is equal to the waterline length. For a well-designed, single-hulled, keeled sailboat, this critical speed in knots is approximately 1.4 times the square root of the waterline length in feet. It can be readily seen, therefore, that the reduction in resistance of a conventional hull can only be achieved by increasing the length of the vessel's waterline, and by reducing both the frontal area and the total wetted area of the hull. Given the performance limitations of a conventional hull, it is essentially impossible to reduce these areas and simultaneously provide a craft capable of supporting speed producing sail area.

The second major obstacle to improved sailing performance is stability. The driving force acting at the center of pressure of the sail area creates a force tending to overturn the sailboat. Several alternatives are available to improve stability. Ballast may be added below the waterline in order to create a righting moment. However, this additional ballast creates a drag penalty due to the increase in both frontal and wetted area of the hull. A righting moment can also be created by the buoyancy force produced by a multiple hull or outrigger, but this also increases frontal and wetted areas. A third alternative is to utilize a shiftable ballast, usually by shifting the position of the crew. Although this method reduces the performance penalty, it is a nuisance and frequently a safety hazard. Not only is the overturning tendency a safety hazard, but the vertical projected area of the sails diminishes as the craft heels over, thus reducing the driving force available from the sails.

The final major obstacle to improved sailing performance is the inability of a sailboat to proceed into the wind at high speed. This results from the inability of a conventional non-rigid sail surface to maintain its curvature and lift-producing characteristic when subjected to a higher pressure on any part of its leeward side than it feels on its windward side. To properly fill most sails, the airflow must make an angle of at least 105 degrees with the resultant lift force. There is substantially no forward component of the lift or driving force until the apparent wind, the vector sum of the true wind and the wind induced by the motion of the boat, is almost twenty-five degrees off the bow. As a practical matter, a sailboat generally cannot proceed to windward at less than thirty-five degrees off the true wind, because the boat also has side-drift and its forward motion changes the apparent wind unfavorably. The magnitude of this obstacle becomes even more apparent when it is considered that as the speed of the vessel increases, the direction of the apparent wind swings around until it is coming more nearly from dead ahead. The boat therefore has to turn still further off the wind in order to keep the sails filled. Bearing in mind that the angle between the true wind and the direction of motion is twice that between the relative wind and the boat's direction when wind and boat speeds are equal, a sailboat would have to sail at an angle of seventy degrees from the true wind in order to keep its sails filled when traveling at the speed of the true wind.

Several attempts have been made to eliminate the above described obstacles. The advent of the hydrofoil gave the capacity to raise the hull out of the water and thereby greatly reduce the drag of the hull. However, enough speed had to be attained to create sufficient lift force to lift the hull from the water. Thus, no benefit was obtained unless the wind was sufficiently strong to produce such a speed.

To reduce or eliminate the overturning moment various configurations of non-vertical sails and/or inclined submerged planes have been utilized. All of these attempts, though increasing stability, either failed to provide any lift effect or even created a net negative lift, thus increasing hull drag.

Finally, to improve the ability of the sailing vessel to proceed approximately in the direction of the wind, rigid airfoils have been utilized. Some of these produced negative lift, and none was fast enough to take advantage of the smaller angle of attack attainable from the rigid airfoil. The first sailboat to effectively utilize all of these improvements is described in "The 40-Knot Sailboat" by Bernard Smith, published in 1963 by Grosset and Dunlop of New York. Although the aerohydrofoil sailboat there described made possible radical improvements in performance over the prior art, it still had certain disadvantages in control and stability.

Accordingly, it is an object of this invention to provide a sailboat with a greately increased speed potential.

It is a further object of this invention to provide a highly stable sailboat by eliminating the pitch and roll moments.

It is a still further object of this invention to provide a sailboat with an increased ability to proceed in an upward direction.

It is another object of this invention to provide improved and simplified controls for a high speed sailboat.

Other objects, advantages and novel features of the invention will become apparent from the following detailed description of the invention when considered in conjunction with the accompanying drawings wherein:

FIG. 1 is a perspective view of the sailboat of this invention;

FIGS. 1a through 1d are sectional views taken along section lines 1a—1a through 1d—1d, respectively;

FIG. 2 is a side elevation of the sailboat of this invention;

FIG. 3 is a plan view of the sailboat of this invention;

Figure 6:
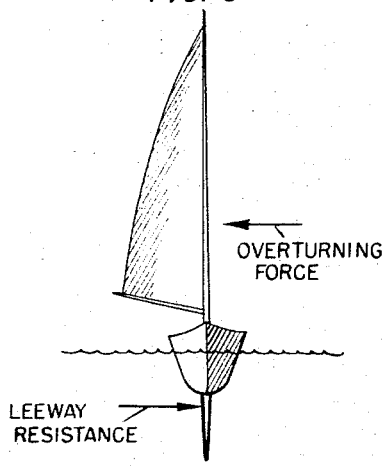
FIG. 6 is a diagrammatic front view of a conventional sailboat showing the dynamic forces which act upon it.
Figure 7:
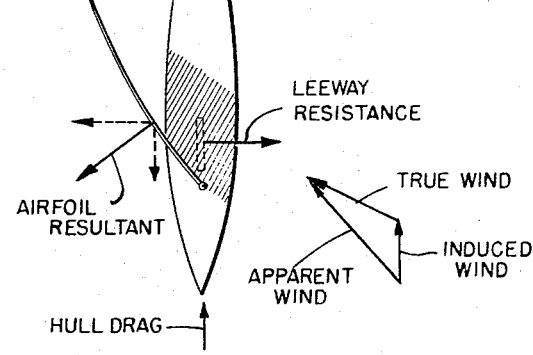
FIG. 7 is a diagrammatic plan view of the dynamic forces acting upon a conventional sailboat.

FIGURES 6 and 7 illustrate in simplified form the forces acting upon a conventional sailboat. The airfoil resultant, which acts upon the sail as a result of the motion of the airfoil-shaped sail through the air, acts at the center of effort of the sail. The sideward component of this airfoil resultant, shown in FIGURES 6 and 7, tends to force the sailboat to drift sideways in a leeward direction, and must be resisted by a force acting below the waterline. This leeway resistance force acts at the center of lateral resistance of the submerged portion of the hull. The forward component of the airfoil resultant is available to propel the sailboat in a forward direction, and this force is resisted by the hull drag force acting in a rearward direction along the longitudinal axis of the boat.

It will be noted from an examination of FIGURES 6 and 7 that none of the opposing pairs of forces has a common line of action. In FIGURE 6 the large vertical displacement between the horizontally acting airfoil resultant and the leeway resistance force creates an overturning moment tending to roll the sailboat in a counter-clockwise direction as viewed in FIGURE 6. To provide stability, this overturning moment must be resisted by a counter-moment provided by a mass suspended below the hull of the boat in the form of a heavy center board or keel. As described above, an alternative to the provision of such additional ballast may be in the form of multiple hulls or movable ballast.

The vertical displacement between the forward component of the airfoil resultant and the hull drag force produces a moment tending to pitch the boat forward, which moment is resisted by the upward force of the bow wave. The magnitude of this moment increases as the boat falls off the wind and the boom is swung further out.

In FIGURE 7 it will be noted that the lines of action of the forward and sideward components of the airfoil resultant are displaced from those of the hull drag force and the leeway resistance force, respectively. In both cases, these lever arms tend to create a counterclockwise yaw momement as viewed in FIGURE 7. The plan view displacement of the sideward component of the airfoil resultant from the leeway resistance force can be readily controlled by the sailboat designer by the relative positioning of the sail and hull lateral areas. The boat illustrated in FIGURE 7 would have what is known as a wether helm; that is, these yaw moments tend to point the boat into the wind if the rudder were released by the skipper.

The direction of the wind is indicated by the vector diagram in FIGURE 7. It will be noted that the apparent wind which the boat feels as is passes through the water is the vector sum of the wind induced by the motion of the boat plus the true wind.

Figure 1:
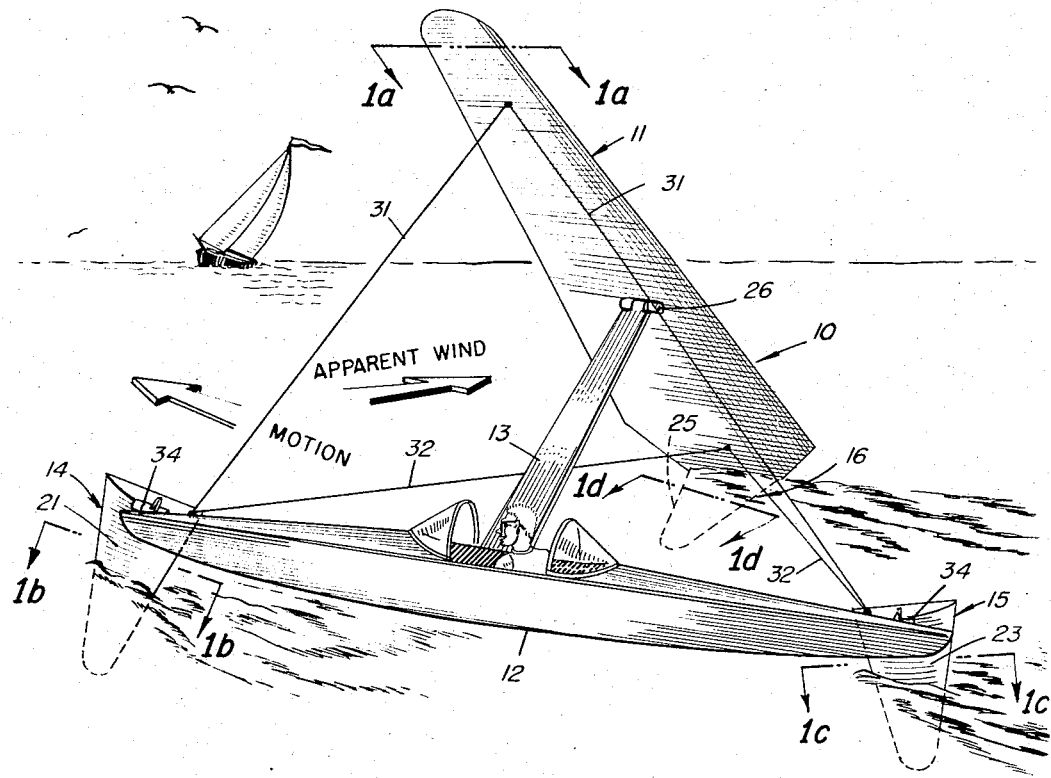

As discussed above, substantial improvement in sailing performance can only be obtained by the reduction or elimination of three major obstacles: hull drag, overturning moments, and non-rigid sails. Such a sailboat is illustrated in FIGURES 1 through 3.

The aerohydrofoil sailboat 10 of this invention comprises a tapered rigid airfoil or sail 11 connected to a fuselage 12 by means of an outrigger 13. This basic structure is supported by identical windward hydrofoils 14 and 15 and by a leeward hydrofoil 16, all of these hydrofoils being buoyant and tapered. In its preferred position, rigid airfoil 11 is normally inclined toward fuselage 12 approximately thirty degrees from the vertical. The point of connection between outrigger 13 and sail 11 should be at the center of effort of the sail. Furthermore, the orientation of sail 11, fuselage 12, and outrigger 13 should be such that the outrigger will be substantially perpendicular to the plane of sail 11 when the sail has a thirty degree inclination. The aerohydrofoil sailboat 10 is fully symmetrical about a traverse axis through the midpoint of fuselage 12.

Figure 1A:
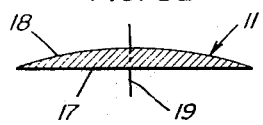

As can be seen from FIGURE 1a, the airfoil or sail 11 has a wing-like cross section. The windward side 17 of the airfoil, that is the side facing fuselage 12 is substantially flat while the leeward side 18 of the foil has a curved surface. Airfoil 11 is symmetrical about a transverse center line 19. The flow of air over airfoil 11 generates a lift force off of surface 18 which acts substantially perpendicularly to side 17 of the foil.

Figure 1B:
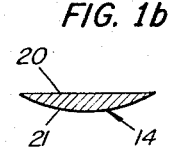
Figure 1C:
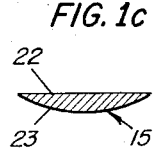

As illustrated in FIGURES 1b and 1c, hydrofoils 14 and 15 also have a symmetrical foil-shaped cross-section. Foils 14 and 15 comprise a flat inward surface 20 and 22, respectively, and a curved outer surface 21 and 23, respectively. The passage of foils 14 and 15 through the water similarly generates a lift force off of curved surfaces 21 and 23, respectively, which acts substantially perpendicularly to the plane of the respective foil.

Figure 1D:
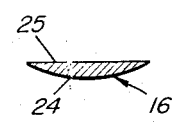

Similarly, as is shown in FIGURE 1d, hydrofoil 16 has a symmetrical foil-shaped cross-section. The lower surface 25 is substantially flat while upper surface 24 is curved, thereby to provide a lift force off of surface 24 which acts substantially perpendicularly to the plane of equidistant from hydrofoils 14 and 15.

Airfoil 11 is pivotally mounted upon outrigger 13 through a hinge 26. The pivot axis of hinge 26 is substantially parallel to the longitudinal axis of fuselage 12, and the airfoil 11 is mounted so that the chords of the foil cross-sections are substantially parallel to a line joining the two windward hydrofoils 14 and 15. Outrigger 13 is rigidly connected to the fuselage 12 at a point equidistant from hydrofoil 14 and 15.

The vertical inclination of airfoil 11 is controlled by two sets of cables. An upper pair of cables 31 runs between the upper portion of sail 11 and the ends of fuselage 12 while a similar lower pair of cables 32 passes between the ends of fuselage 12 and the lower portion of sail 11. The lengths of cables 31 and 32 may be controlled by reels (not illustrated) positioned inside the respective ends of fuselage 12. By shortening cables 31 and lengthening cables 32, the inclination from the vertical of sail 11 may be increased, while the inclination may be decreased by lengthening cables 31 and shortening cables 32. The purpose of this adjustment of the inclination of the sail 11 will be described hereinafter.

Figure 4:
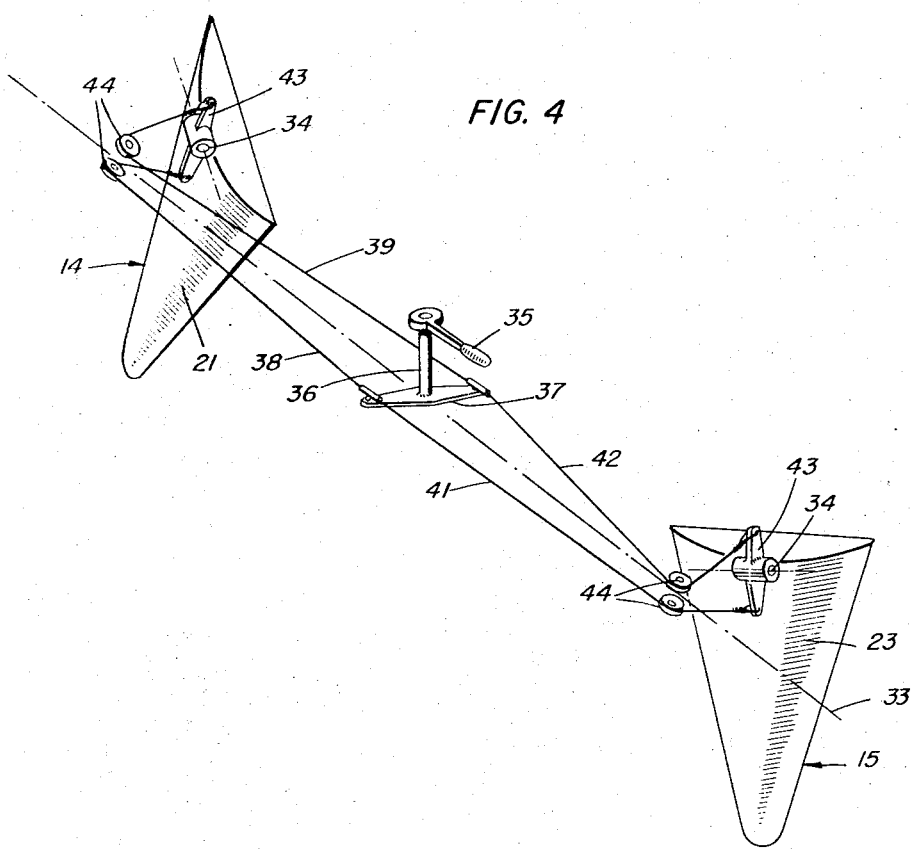
FIG. 4 is a perspective view of a portion of the sailboat of this invention, illustrating the controls of the windward hydrofoils.

Windward hydrofoils 14 and 15 are pivotally mounted on the respective ends of fuselage 12. Pivot axes 34 are skew with respect to each of the longitudinal, transverse, and vertical axes of the sailboat 10, and make identical mirror-image angles with the longitudinal fuselage axis 33. The control system for regulating the inclination of hydrofoils 14 and 15, illustrated in FIGURE 4, comprises a helm 35 mounted upon a vertical shaft 36, a crank 37 also mounted upon shaft 36, a series of control cables 38, 39, 41, and 42, and a control horn 43 mounted upon each of the respective hydrofoils 14 and 15. A series of pulleys 44 may be utilized to change the direction of the respective cables at the point where they exit from the fuselage 12. It will be observed from FIGURE 4 that the windward foils 14 and 15 rotate in opposite directions about their respective axes 34 as helm 35 is moved. A total range of foil rotation of approximately twenty degrees is considered sufficient to provide the necessary directional control of the sailboat.

The sailboat 10 illustrated in FIGURES 1 through 4 is moving generally from right to left on a port tack, that is, the wind is coming from the port side of the bow. It will be noted from each of FIGURES 1 through 4 that the angle which each of the respective foils 14 and 15 makes with the fuselage 12 is different, that is, the left hand or bow foil 14 is more nearly in a vertical plane than is the right hand or stern foil 15. Although these respective angles are not the same, the inclinations are such that the lines formed by the intersection of the plane of the water and faces 20 and 22 of these foils will normally point in the direction of motion of the sailboat.

Figure 5:
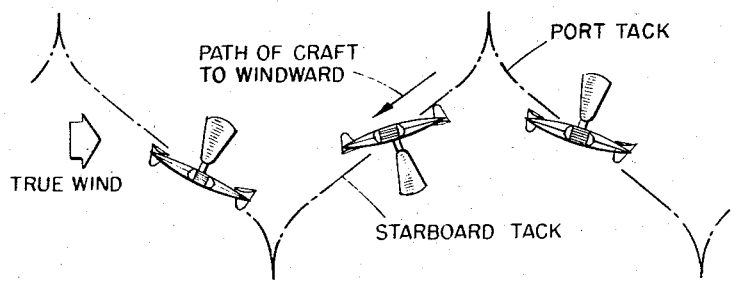
FIG. 5 shows a typical path which the sailboat of this invention takes as it tacks into the wind.

Because of the symmetric configuration of the airfoil 11, the aerohydrofoil craft of the present invention does not operate best unless the wind is coming from the fuselage side of the craft, that is unless the angle of attack is such that the wind strikes surface 17. Improper lift would be generated from airfoil 11 when the wind swung around to the curved side of foil 11. Therefore, in order to proceed on a starboard tack, the craft must change its fore and aft orientation. Foil 15 must become the bow foil and foil 14 must become the aft foil. Furthermore, the pilot of the craft must reverse his position in the cockpit. A typical path which the craft would trace while tacking to windward is illustrated diagrammatically in FIGURE 5, with the transverse path dimension compressed for convenience.

It is contemplated that once a new tack was established, the setting of the forward windward hydrofoil would be fixed and that minor adjustments in the course of the sailboat 10 would be achieved by slight adjustments of the inclination of the windward hydrofoil which was in the stern position on the selected tack. Helm 35 could be utilized as a tack selector, that is, it could have a detent position for the port tack and one for the starboard tack. Further controls (not illusatrated) for providing independent adjustment of the stern foil could take the form of a simple override device to overcome the stern hydrofoil setting provided by the tack selector. Since such a small portion of the aerohydrofoil craft is immersed in the water, as compared with the hull mass of a conventional sailboat, very slight variations in the stern hydrofoil inclination are sufficient to achieve ruddering control.

The provision of the single skewed pivot axis 34 for each of the windward hydrofoils greatly simplifies the controls for these hydrofoils. Heretofore, it was necessary to provide two mutually perpendicular pivot axes for each of these hydrofoils, thereby doubling the number of required control systems and operations for setting the hydrofoil inclinations. Not only does the single skewed pivot axis for each of the windward hydrofoils reduce the complexity of the controls, but the coupling together of the controls for the two windward hydrofoils also simplifies this system. Both windward hydrofoils may thus be simultaneously set by the use of a single helm or control lever. Furthermore, since the two windward hydrofoils rotate in opposite directions during a change in setting, the transitional hydrodynamic forces acting upon them during adjustment are in opposite directions. Thus, the force of the water acting on one of the foils aids in supplying the effort necessary to adjust the other foil against the resistance of the water.

As discussed above, means may be provided to vary the inclination of the airfoil 11. Such an adjustment could be utilized to vary the speed of the craft, as is done with conventional sailboats by reducing sail area. By setting airfoil 11 at a greater angle from the vertical, the horizontal forward driving component of the resultant force would be reduced, thus slowing the craft and reducing the hazard in extremely high winds. To permit leeward hydrofoil 16 to maintain a substantially constant angle with respect to the waterline during such changes in airfoil inclination, a hinge connection (not illustrated) is provided between these two elements. A parallelogram linkage between hydrofoil 16 and outrigger 13 would provide automatic adjustment of this angle.

Figure 8:
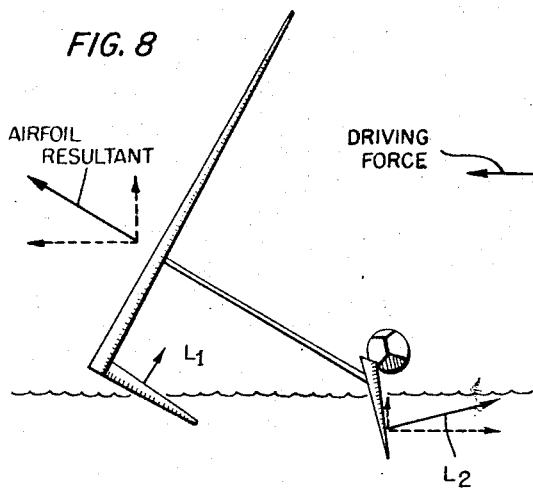
FIG. 8 is a diagrammatic front view of the dynamic forces acting upon the sailboat of this invention.
Figure 9:
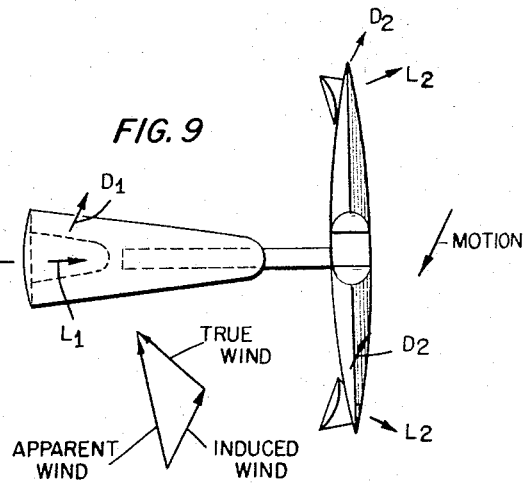
FIG. 9 is a diagrammatic plan view of the dynamic forces acting upon the sailboat of this invention.

Turning now to the force diagrams of FIGURE 8 and FIGURE 9, it will be first observed that the airfoil resultant acting perpendicularly to the surface of the airfoil acts along the axis of the outrigger. In the configuration illustrated, the line of action of this airfoil resultant would pass within a short distance of the center of lateral resistance of the three hydrofoils. This center of lateral resistance would lie close to the two windward foils, since the substantially vertical attitude of the two windward foils contributes essentially all leeway resistance and relatively little lift force, while the substantially horizontal attitude of the leeward foil contributes very little leeway resistance. The lift force $L_2$ shown generated by the windward foils is considerably greater in magnitude than the lift force $L_1$ generated by the leeward foil. This discrepancy results from the fact that $L_2$ represents the sum of the lift forces generated by the two windward foils. Further, the vertical component of the driving force generated by the airfoil would create an upward force on the sailboat which would assist the leeward foil in maintaining the leeward side of the sailboat afloat, thereby reducing the submergence and lift generated by the leeward foil. At moderate and high speeds, only the tip of the leeward foil would be submerged.

The center of gravity of the aerohydrofoil sailboat would lie close to the left side of the fuselage, as viewed in FIGURE 8. It can be seen from FIGURE 8 that the lines of action of the airfoil resultant, the lift resultant $L_2$ acting off the windward foils, and the gravitational force acting vertically through the center of gravity would come very close to having a common point of intersection. Thus, ignoring the relatively small force $L_1$, generated by the windward foil, there would be essentially no wind-induced overturning moments. If desired, a reverse or clockwise moment could be created by an appropriate geometric configuration.

With further regard to the location of the center of gravity, it has been found to be advantageous to place it slightly to windward of the centroid of flotation. Such a location keeps the leeward side light, which is desirable under gusting wind conditions. Otherwise, at low speeds, when the leeward foil has developed only a small dynamic lift vector, a gust of wind striking the airfoil would submerge the leeward foil, and the craft would have great difficulty in accelerating.

In FIGURE 9 it will be observed that the drag forces $D_1$ and $D_2$ have been oriented in the opposite direction to that of the motion of the sailboat, and the lift forces $L_1$ and $L_2$ and the driving force have been oriented perpendicularly to the chord of their respective foils. It will also be observed that the driving force acts perpendicularly to a line connecting the two windward foils. A side elevation of the craft would therefore indicate no dynamic moment off the sail tending to pitch the sailboat either forward or rearward. There thus being essentially no dynamic overturning or pitching moments in either of two orthogonal planes, it is evident that the unique geometry of the aerohydrofoil sailboat of this invention provides a fully stable craft.

Not only is the aerohydrofoil sailboat of this invention more stable than conventional sailboats, but it has an increased ability to proceed into the wind. As discussed above, the minimum angle between the apparent wind and the resultant force off the sail which a conventional sail can provide is approximately 105 degrees. With a rigid airfoil as utilized by the aerohydrofoil sailboat, this angle can be as low as ninety-three degrees. With a five degree airfoil angle of attack relative to the apparent wind, a four degree effective hydrofoil angle of attack relative to the water, and with an additional eight degrees between the chords of the air foil and hydrofoil to provide directional stability, the aerohydrofoil craft has the ability to sail in a direction that is only seventeen degrees from the ralative wind, compared with twenty-five or thirty degrees for a conventional sailboat.

A substantial increase in speed performance is also possible with the unique sailing craft of this invention. Ordinary sailboats can equal the speed of the true wind only in very light winds, since wave drag becomes a dominant factor with higher winds. A catamaran may equal the speed of the wind under higher wind conditions, but in either case such performance can only be attained on a broad reach, that is, when the true wind is between 100 and 130 degrees off the boat's heading. In a thirteen knot wind the sailing craft of this invention can equal the speed of the wind on a course only thirty-four degrees from the true wind vector. The speed of the craft would increase, as it fell off this thirteen knot wind, to a maximum of thirty-five knots at an angle of 110 degrees off the true wind. To equal the speed of the wind under conditions of lighter winds, the aerohydrofoil would have to increase its angle of attack by falling further off the true wind to an angle greater than thirty-four degrees.

Because of the very short waterline length of the hydrofoils, the wave drag maximizes at a very low speed. With a four foot waterline length, maximum drag would occur at a speed of only three knots. The driving force of the airfoil is easily sufficient to push the aerohydrofoil craft beyond this speed range of maximum wave drag. Drag is further reduced by the lift forces generated by the airfoil and hydrofoils, which forces raise the hydrofoils further out of the water, decreasing the immersion of the hydrofoils and the drag produced thereby.

Thus, the unique aerohydrofoil sailboat configuration of this invention provides substantial improvements in stability, speed potential, and ability to proceed to windward over previously known sailing craft potentials. It offers several improvements over the earlier aerohydrofoil version discussed in "The 40-Knot Sailboat," discussed above. By getting the two windward foils more nearly vertical, they can supply both lift and leeway resistance, without the need for an additional angled flange at the lower tip of the foil. Thus, these hydrofoils are more efficient hydrodynamically.

Other advantages accrue from the shift of the fuselage to the windward side. The control system for the windward hydrofoils is thus closer to these foils, making its action simpler and more positive. Also, the leeward side is lightened, thereby improving acceleration and performance in gusting winds as discussed above. Furthermore, it is easier to vary the inclination of the airfoil, since the hinge structure is greatly simplified and the structure made more rigid.

Where vertical air rudders are mounted on the fuselage of a non-manned aerohydrofoil craft in order to provide directional stability, the present configuration allows them to be placed well away from the airfoil, so that they will not be blanketed by the airfoil.

Obviously many modifications and variations of the present invention are possible in the light of the above teachings. It is therefore to be understood that within the scope of the appended claims the invention may be practiced otherwise than as specifically described.

What is claimed is:
1. A sailing craft comprising:
   first, second and third hydrofoil means each having a positive static buoyancy characteristic, and collectively having sufficient displacement to provide flotation for said sailing craft under static conditions;
   fuselage means supported at a first end by said first hydrofoil means and at the other end by said second hydrofoil means;
   rigid airfoil means supported on, and extending upwardly from, said third hydrofoil means;
   outrigger means connected to said fuselage means and to said rigid airfoil means, said outrigger means being so configured and disposed as to maintain said rigid airfoil means at an acute angle with respect to the plane of flotation of said craft defined by said first, second, and third hydrofoil means.

2. The sailing craft of claim 1 wherein said first and second hydrofoil means are pivotally mounted at the respective ends of said fuselage means, the pivot axes of said first and second hydrofoil means being non-parallel to each other and symmetrically disposed with relation to the longitudinal axis of said fuselage means.

3. The sailing craft of claim 1 wherein the angle of attack of said first and second hydrofoil means may be varied to provide directional control for said sailing craft.

4. The sailing craft of claim 1 wherein said outrigger means includes a rigid beam connected to said rigid airfoil means at the center of aerodynamic effort thereof and substantially perpendicularly to the plane of said rigid airfoil means, thereby to orient the line of action of the aerodynamic lift force generated by the flow of air over said rigid airfoil means colinearly with the axis of said rigid beam.

5. The sailing craft of claim 1 wherein a chord of said rigid airfoil means is substantially parallel to an imaginary line connecting sad first and second hydrofoil means.

6. The sailing craft of claim 1 which is symmetrical with respect to a vertical plane forming a transverse perpendicular bisector of the longitudinal axis of said fuselage means, and which craft is therefore equally capable of sailing with either end of its fuselage means as the bow of said craft.

7. The sailing craft of claim 1 which is asymmetric when viewed along a line parallel to the longitudinal axis of said fuselage means.

8. A sailboat comprising:
   a fuselage means;
   sail means for providing a propelling force;
   connecting means for rigidly mounting said sail means on said fuselage means;
   first, second, and third buoyant hydrofoils mounted on said sailboat;
   said hydrofoils collectively providing full static and dynamic flotation, leeway resistance, and directional control for said sailboat;
   said first hydrofoil being mounted for pivotal adjustment about a first single axis;
   said second hydrofoil being mounted for pivotal adjustment about a second single axis;
   said first and second axes being intersecting and non-colinear;
   control means coupling together said first and second hydrofoils, whereby selective simultaneous pivotal movement of said first and second hydrofoils in opposite rotational directions about said first and second axes, respectively, may be achieved by actuation of said control means, thereby to provide directional control of the path of said sailboat.

9. The sailboat of claim 8 wherein said first and second axes are symmetrically disposed with relation to said fuselage means at opposite ends thereof, whereby said sailboat may selectively sail with equal facility with either end of said fuselage means as its bow.

No references cited.

MILTON BUCHLER, *Primary Examiner.*

ANDREW H. FARRELL, *Examiner.*